United States Patent [19]

Feldman

[11] Patent Number: 4,669,937

[45] Date of Patent: Jun. 2, 1987

[54] CAPPED NUT

[75] Inventor: Sidney H. Feldman, Southfield, Mich.

[73] Assignee: Microdot Inc., Darien, Conn.

[21] Appl. No.: 870,918

[22] Filed: Jun. 5, 1986

Related U.S. Application Data

[63] Continuation of Ser. No. 268,779, Jun. 1, 1981, abandoned.

[51] Int. Cl.⁴ .................... F16B 37/14; B21D 53/20
[52] U.S. Cl. .................................. 411/429; 411/376; 10/86 C
[58] Field of Search .............................. 411/429–432, 411/373, 376; 10/86 C; 219/105, 107

[56] References Cited

U.S. PATENT DOCUMENTS

| | | | |
|---|---|---|---|
| 877,927 | 2/1908 | Hoffmann | 219/105 |
| 3,219,790 | 11/1965 | Johnson | 411/429 |
| 3,955,231 | 5/1976 | Erdmann | 411/429 |
| 4,123,961 | 11/1978 | Chaivre et al. | 411/429 |

*Primary Examiner*—Thomas J. Holko
*Assistant Examiner*—Neill Wilson
*Attorney, Agent, or Firm*—Lyman R. Lyon

[57] ABSTRACT

The disclosure relates to a wheel nut comprising a nut body having conventional wrenching flats that are sheathed in part by a stainless steel sheet metal cap. The cap covers one end of the nut body and extends down the wrenching flats thereof. The nut is provided with a plurality of axially extending weld nibs of unique configuration which permit the stainless steel cap to be welded to the nut body by conventional resistance welding techniques.

1 Claim, 4 Drawing Figures

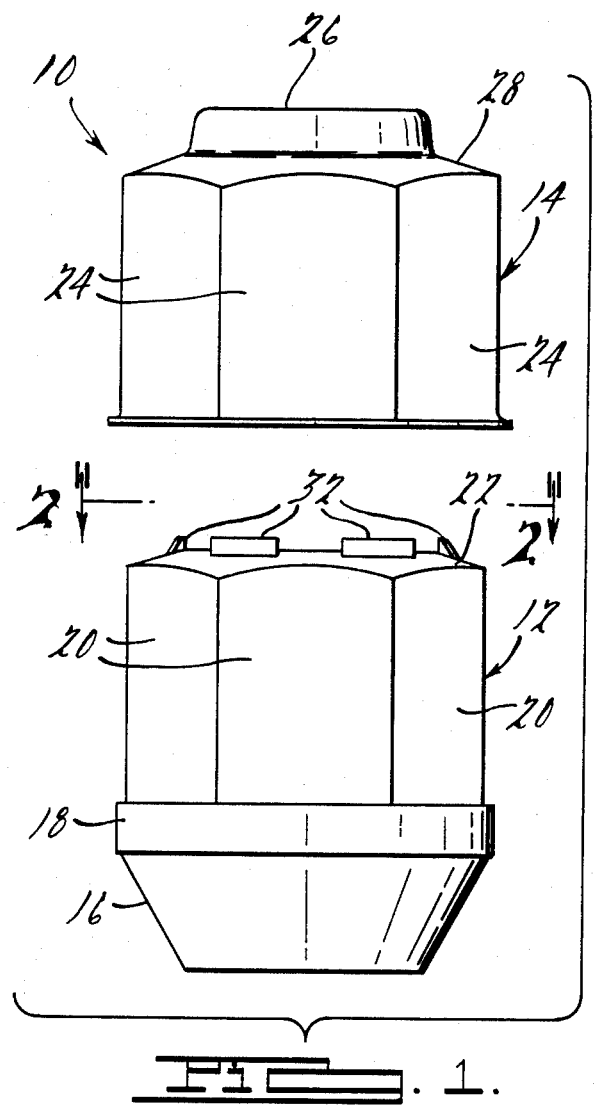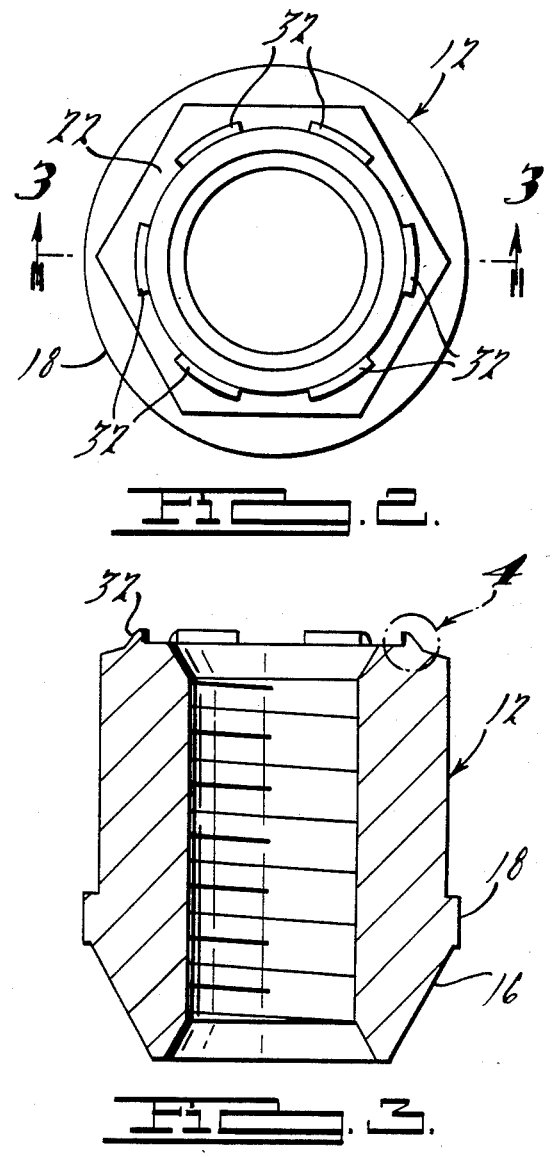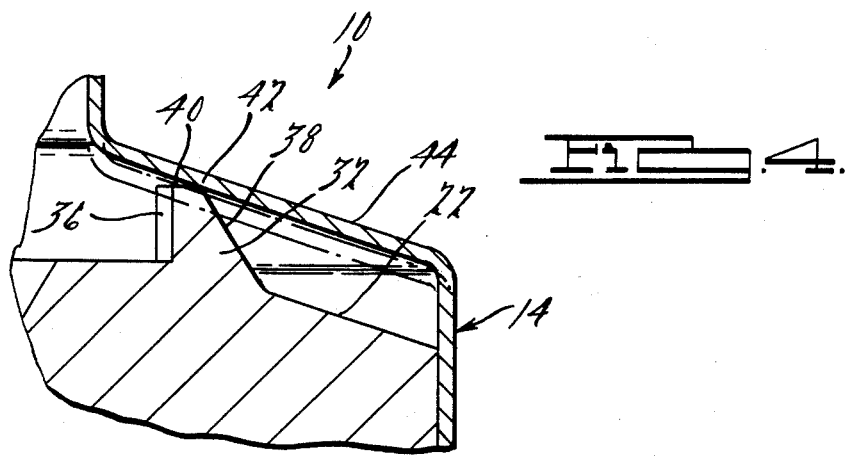

CAPPED NUT

This is a continuation of co-pending application Ser. No. 268,779 filed on June 1, 1981, now abandoned.

BACKGROUND OF THE INVENTION

1. Field of the Invention

The invention relates to a two piece nut comprising a nut body having a threaded bore and external wrenching surfaces and a sheet metal cap that encloses one end of the nut body and the wrenching surfaces thereof and is welded to the nut body.

2. Description of the Prior Art

Various methods have been utilized to secure a cap to a nut body to improve the aesthetics of the resulting nut as well as to protect the end of a complementary bolt from the environment. However, when the cap encloses the wrenching surfaces of the nut, the attachment mechanism must be sufficiently strong to prevent accidental loosening under the forces exerted during wrenching of the nut.

For example, U.S. Pat. No. 3,364,806 discloses a nut wherein the cap is secured to the nut body by crimping the free end of the cap around the nut body.

Efforts have also been made to secure the cap to the nut body with adhesive. However, the relatively low tensile and shear strength of adhesives as well as difficulty encountered in masking the nut threads from adhesive present significant problems to the technique.

U.S. Pat. No. 4,123,961 teaches a capped nut wherein the cap is welded to the nut body. The problem of heat generated in the welding process is solved by limiting the weld time thereby to limit metallurgical changes to the cap.

BRIEF SUMMARY OF THE INVENTION

The present invention relates to an improved structural configuration for the body portion of a capped nut that facilitates welding of the cap to the nut body. A plurality of upstanding weld nibs of novel configuration are controllably compressed incident to a conventional resistance welding cycle thereby to control heat buildup and attendant changes in the color and metallurgical makeup of the cap.

BRIEF DESCRIPTION OF THE DRAWINGS

FIG. 1 is a view of a capped wheel nut in accordance with the present invention prior to assembly of the cap with the nut body.

FIG. 2 is a sectional view taken in the direction of the arrows 2—2 of FIG. 1.

FIG. 3 is a sectional view taken along line 3—3 of FIG. 2, and

FIG. 4 is a view taken within the circle "4" of FIG. 3, with the cap shown in full lines at an initial position prior to welding and in a final position after welding.

DESCRIPTION OF THE PREFERRED EMBODIMENT

As best seen in FIG. 1 of the drawing, a capped nut 10 comprises a body portion 12 and sheet metal cap portion 14. The body portion 12 is formed in the conventional manner in a cold heading machine or nut former and the cap is formed in a conventional eyelet machine or progressive die. Characteristically, the nut body 12 is formed from steel and the cap 14 is formed from stainless steel.

The nut body 12 has a conical seating surface 16 for acceptance in a complementary conical seat in the wheel of a motor vehicle. The nut body has a radial shoulder 18 spaced from the conical section 16 that defines the end of a plurality of wrench flats 20. The wrench flats 20 are disposed in a conventional hexagonal array.

The cap 14 is provided with a plurality of wrench flats 24 complementary to the flats 20 on the body 12 so as to be acceptable thereover in close telescoping relationship. An upper end 26 on the cap 14 overlies the body 12, a truncated conical portion 28 extending between the upper end 26 and the wrench flats 24 to facilitate attachment of the cap 14 to the body 12 by welding, as will be described.

In accordance with the present invention, an upper end portion 30 of the nut body 12 is provided with six weld nibs 32 of like configuration.

As seen in FIG. 4, the nib 32 is of arcuate configuration defined by an arcuate cylindrical radially inner wall 36 and an arcuate frusto-conical outer wall 38. An upper edge portion 40 of the nib 32 is of arcuate configuration, the outer circumferential edge 42 thereof being rounded for the seating acceptance of the intermediate portion 28 of the cap 14.

As best seen in FIG. 2, the circumferential arc of each nib 32 is approximately 30° so that after welding six discrete arcuate attachment points are provided between the body 12 and cap 14. It is also to be noted that the nibs are located radially inwardly of the juncture of each pair of wrench flats 24 on the cap 14.

As seen in FIG. 4, due to the fact that the nibs 32 are heated to a temperature that permits plastic deformation thereof, each nib 32 is compressed from the solid line position to the dotted line position illustrated due to pressure of the welding electrodes, not shown. Since the cross sectional area of the nib 32 increases upon compression due to the conical cross section thereof, an increase in resistance to compression of each nib 32 is exhibited as the compression force increases. Thus, a self regulating relationship between pressure and nib compression is obtained insuring that the intermediate portion 28 of the cap 14 never contacts the end 22 of the body 12.

From the foregoing description it should be apparent that the upstanding arcuate configuration of the weld nibs 32 both controls heat transfer to the stainless steel cap 14 incident to welding thereof to the nut body 12 and provides a positive means for securing the cap 14 to the nut body 12 in a manner that precludes rupture due to wrenching forces.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A capped nut comprising a nut body having a load bearing end and an opposite end with a central threaded aperture extending therebetween, said body having a plurality of wrenching flats radially outwardly of said aperture, and a cap having a skirt portion covering the wrenching flats on said nut body and a cover portion for enclosing the opposite end of said nut body, an intermediate portion of said cap extending radially between the skirt and cover portions of said cap, the opposite end of said nut body having a plurality of upstanding circumferentially extending, relatively narrow weld nibs welded to the intermediate portion of said cap and supporting said cap, said weld nibs being of arcuate configuration and extending circumferentially through an arc of approximately 30° and being spaced from one another approximately 30°, a radially inner wall of said nibs being cylindrical and a radially outer wall thereof being of truncated conical configuration, said weld nibs being partially compressed incident to welding of said cap to said nut body whereby the intermediate portion of said cap is maintained in spaced relationship with respect to the opposite end of said nut body.

* * * * *